Dec. 1, 1970  W. L. HOERRNER  3,544,135
DUCT PRESSURE COMPENSATOR
Filed Jan. 31, 1969
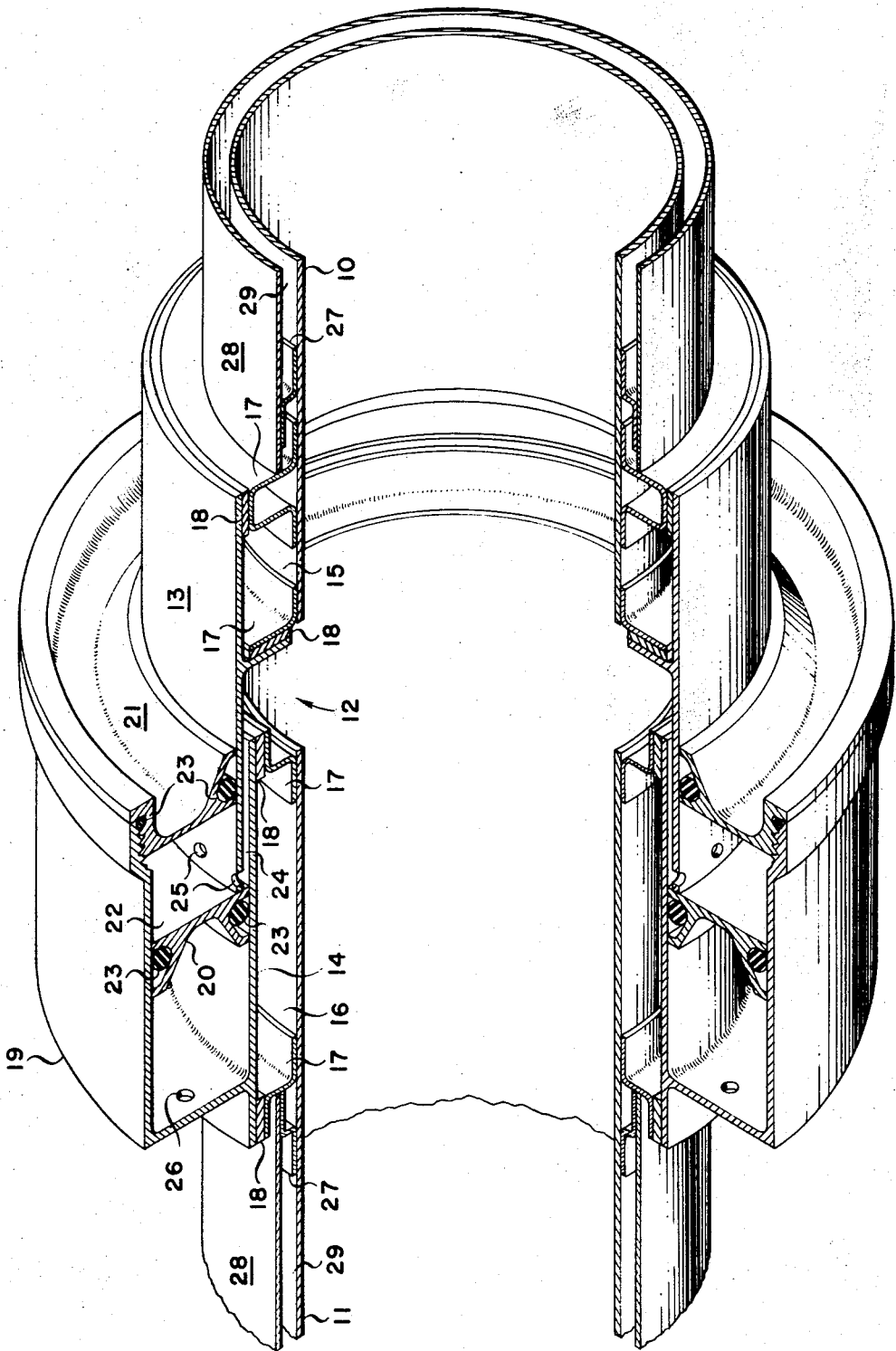
*INVENTOR.*
WILLIAM L. HOERRNER
BY George C. Sullivan
　　Agent
John J. Sullivan
　　Attorney 3,544,135
DUCT PRESSURE COMPENSATOR
William L. Hoerrner, Marietta, Ga., assignor to Lockheed
Aircraft Corporation, Burbank, Calif.
Filed Jan. 31, 1969, Ser. No. 795,573
Int. Cl. F16l 59/16
U.S. Cl. 285—47                                7 Claims

ABSTRACT OF THE DISCLOSURE

A compensator is provided for use in high temperature (above 500° F.) pressure fluid ducting systems to absorb thermal expansion. State of the art compensator designs often require metal bellows in order to perform the sealing function at such temperatures. Penalties are imposed upon the system in these designs due to the bellows acting as springs, causing compression (buckling) loads in the ducting at certain operating conditions and over-design of the compensator to overcome these spring loads. The design of this proposed compensator allows use of existing elastomeric sealing ring materials by provision of protective insulating means for the seals. At the same time, the proposed compensator construction allows for a weight and space reduction to half of that of known units, eliminates compression loading in the system, and facilitates replacement of the seals when worn out.

---

This invention relates to duct pressure compensators which permit the thermal expansion and contraction of pressurized fluid conveying conduits which are, in effect, secured or anchored at opposite ends, and is particularly directed to such a duct pressure compensator designed and constructed to operate at temperatures on the order of three times, and more, those heretofore possible with known designs and constructions.

While not limited to, the present invention finds particular utility when applied to the ducting systems typically employed in aircraft, especially pneumatic duct systems. With such pneumatic duct systems, not only is it important that compensators be provided which eliminate the possibility of buckling in the length of the conduits under high temperature expansion while the pressures of the fluid passing therethrough is maintained and controlled, but also it is important that no appreciable increase in weight result. Moreover, it is desirable that installation, maintenance and repair problems be held to a minimum, if not avoided altogether.

Prior attempts to satisfy the foregoing and other related conditions have resulted in ducting systems which include special routing, i.e., loops and/or bends, to accommodate the movement (expansion and contraction) of the duct coincident with thermal fluctuations. This has not been effective because of the additional space requirements and also the added weight, not only due to the increased length of duct, but also the supports, carriers and mounts required therefor. In simple applications, i.e., where relatively high temperatures are not involved, telescoping ducts or slip joints, as they are commonly called, can be and have been employed. While these slip joints impose a penalty of increased weight, this is usually less than the weight penalty of the circuitous ducting when the alternate routing technique is employed. Moreover, a slip joints offer the advantage of reduced space requirements, which often preclude special routing of the ducting as a solution.

In high temperature applications, however, slip joints are impractical, largely because the conventional non-metallic seal such as those fabricated of elastomers, like rubber, Teflon, nylon, etc., are physically incapable of avoiding rapid deterioration at temperatures on the order of 500° F. and above, as primarily contemplated herein. This makes it necessary to resort to metal seals which not only add undesirable weight, but (and what is more important) are prone to wear due to friction and deformation, the ratio of deformation to yield strength of metal being appreciably lower than that of non-metallics like rubber, Teflon, nylon, etc.

Since there is no practical dynamic metal seal (in the conventional sense) within the present day state of the art, the bellows has been resorted to to serve the sealing function. However, the bellows introduces spring loads into the system which promote conduit buckling. Also, because of these inherent spring and residual loads, installation problems occur, and these are magnified by the fact that the bellows is necessarily unduly long due to the limited amount of usable motion it can take without fatigue failure.

The present invention is, therefore, directed primarily to a duct pressure compensator especially designed and fabricated so as to permit the use of non-metallic elastomeric seals in temperature applications several orders of magnitude higher than possible with present day compensators. At the same time, the present compensator design and construction is such that its installation and replacement is readily accomplished without the requirement of complex tools and special techniques. When thus installed this compensator is totally devoid of spring loads, is of minimum weight and possesses optimum service and fatigue life.

Generally stated, the instant compensator is so designed and constructed as to locate all seals required for its leakproof assembly remote from the conduit in which the high temperature fluid operates and includes heat dissipating and absorbing insulation means between these seals and the relatively hot fluid and conduit. The environment in which the seals are located is thereby established at and held to a substantially lesser temperature than that of the pressurized fluid and conduit. This permits the use of seals fabricated of elastomeric material such as that usually employed in the conventional O-ring type seal.

In addition, the design of the compensator herein proposed includes means to maintain it under load at least equal to, and actually a predetermined amount greater than, that of the fluid within the conduit and to apply such load in opposition to that within the conduit. The loads resulting from the conduit pressure are thereby counteracted and the conduit is maintained in tension at all times rather than being allowed to compress as would otherwise occur. Stated differently, the fluid pressure within the conduit is not applied as a load on the end supports for the ducting system, but is absorbed by the compensator during the relative movement, i.e., expansion and contraction of the ducts.

With the above and other objects in view as will be apparent, this invention consists in the construction, combination and arrangement of parts all as hereinafter more fully described, claimed, and illustrated in the accompanying drawing, wherein the single figure is an isometric view, partly in longitudinal section, of adjacent ends of a pair of ducts interconnected by a compensator designed and constructed in accordance with the teachings of this invention to show primarily the fabrication of the compensator and the operation of its parts to permit relative movement of the ducts as caused by the temperature variations and to counteract the fluid loads within the ducts, an intermediate position of the assembly being illustrated.

Referring more specifically to the embodiment of the invention illustrated in the drawing, 10 and 11 designate the end portions of a pair of pressurized fluid conveying ducts typical of those found in pneumatic systems for aircraft. For all intents and purposes the remote ends of the respective ducts 10 and 11 are secured to fixed structure, i.e., are immovable, while their adjacent ends are adapted to be located in spaced relation, as at 12, to permit predetermined linear movement relative to each other. The minimum dimension of this space or gap 12 may be established for example by abutting, offset projections from each duct end. These projections are the adjacent ends of the rings 13 and 14 which encircle each of the respective ducts 10 and 11.

The rings 13 and 14 are in axially spaced relation to their respective ducts 10 and 11 and each defines an annular chamber 15 and 16 respectively. For purposes to become more apparent, the transverse dimension of each of the annular chambers 15 and 16 is predetermined to establish a heat absorbing and/or dissipating insulator which in the preferred form of the invention is a dead air barrier around the associated ducts 10 and 11. To this end, each ring 13 and 14 is permanently secured to its associated duct 10 and 11 by means of an encircling, flanged bracket 17 which may be for example a simple angle, a "Z" or "hat" section configuration, one of each being illustrated. A combination pressure seal 18 and heat barrier, fabricated for example of asbestos or the like, is provided between each bracket 17 and the associated portion of each ring 13 and 14 to assure that each insulating air chamber 15 and 16 as defined by each ring 13 and 14, the wall of the adjacent duct 10 and 11 and the brackets 17 is virtually leakproof and the possibility of heat transfer minimized.

Mounted on one of the rings, for example the ring 14, so as to extend radially therefrom is an annular cup 19 which opens in the direction of the other ring 13 which extends into it. The ring 13 terminates in a perpendicularly disposed end 20 having an overall dimension substantially equal to the internal transverse dimension of the cup 19. The cup 19 thus constitutes a cylinder with the ring end 20 forming a piston head adapted to reciprocate therein upon relative movement of the ducts 10 and 11. The open end of the cup or cylinder 19 is appropriately formed or otherwise provided with means, such as for example internal threads to receive an annular plug 21, which thereby closes the cylinder 19 and establishes an internal pressure chamber 22. The peripheral surfaces of both the end or piston head 20 and annular plug 21 are recessed to accommodate suitable seal means, such as for example a standard type O-ring 23 fabricated of an elastomeric material like Teflon, rubber, nylon, etc.

The extending portion of the ring 13 which constitutes the piston rod serves as the defining wall of the pressure chamber 22 within the cylinder 19 and is spaced from the other ring 14 to produce a fluid passage 24 therebetween. Adjacent the piston head 20 the ring 13 is pierced by one or more vent holes 25 so that communication is established between the pressure chamber 22 of the cylinder 19 and the interior of the ducts 10 and 11 through the space or gap 12 and passage 24. Thus, fluid within the ducts 10 and 11 is allowed to fill the pressure chamber 22, and by configuring the faces of the piston head 20 and closure plug 21 exposed to the chamber 22, the effective force of the pressure can be established with relation to that of the fluid in the ducts 10 and 11 which acts on the end supports or fixed structure at opposite ends of the ducts 10 and 11. The aggregate piston area is thereby made to be a pretermined amount larger than the cross-sectional duct area so that a pre-established tension is produced and maintained at all times in the conduit formed by the ducts 10 and 11.

One or more vent or bleed outlets 26 are provided in the base wall of the cylinder 19 for the escape to atmosphere of air on the outer side of the piston 20 with respect to the pressure chamber 22 upon movement of the psiton 20 in that direction. On the other hand, movement of the piston in the opposite direction forces air from the chamber 22 back into the ducts 10 and 11 through vent or vents 25 and passage 24.

If desired or required, a separate insulating wrapper may be provided around the ducts adjacent the compensator as above described. To this end, appropriate fittings, such as the Z-section brackets 27 surround and are secured to each duct 10 and 11. An enclosing sheath or rigid tube 28 is in turn mounted to the outer flange of each such bracket 27. A trapped dead air space 29 is thus established and maintained for insulation purposes.

As an alternative to air, the space 29 (and this is also true of the insulating chambers 15 and 16) may be packed with suitable heat absorbing material. As stated, however, in the preferred form of the invention, dead air is considered the insulating agency.

While the best mode of carrying out the invention has been hereinabove described and illustrated, various modifications are recognized. These may be employed with equal effect and are intended to be covered by the appended claims.

What is claimed is:

1. A duct pressure compensator adapted to interconnect the ends of a pair of relatively high temperature, pressurized fluid conveying ducts when disposed coaxially adjacent each other comprising:
   a thermal insulator completely surrounding each said duct end;
   an offset projection carried by and extending from each said insulator toward the other, said projections being disposed in axially spaced and overlapping relation with each other;
   a cylinder carried by one of said projections and a piston complemental to said cylinder carried by the other of said projections for reciprocating coaction therewith;
   a fluid passage establishing constant communication between the interior of said ducts and the interior of said cylinder on one side of said piston; and
   a vent establishing constant communication between the interior of said cylinder on the other side of said piston and atmosphere.

2. The compensator of claim 1 wherein each of said projections includes a peripheral surface, one of said surfaces carrying a first lateral extension terminating in a second lateral extension substantially parallel with said one peripheral surface to constitute the cylinder aforesaid, and the other of said peripheral surfaces terminating in a lateral flange to constitute the piston aforesaid:
   a removable, annular plug closing the end of said cylinder; and
   a seal associated with each peripheral surface of said piston and said plug.

3. The compensator of claim 2 wherein said fluid passage includes an opening piercing said other peripheral surface adjacent said lateral flange.

4. The compensator of claim 1 wherein each said thermal insulator is formed by a ring encircling its associated duct end in axially spaced relation therewith and closed at opposite ends by fluid-tight, thermal barriers defining a chamber, and each said projection is defined by an extension on one of said rings.

5. The compensator of claim 1 wherein the total effective area of said piston is at least equal to the cross-sectional area of said ducts.

6. The compensator of claim 1 wherein the total effective area of said piston is a predetermined amount greater than the cross-sectional area of said ducts.

7. The compensator of claim 4 including an enclosing sheath mounted on each of said ducts in spaced relation thereto adjacent the innermost of the barriers aforesaid.

References Cited

UNITED STATES PATENTS

| | | | |
|---|---|---|---|
| 853,974 | 5/1907 | Hayden | 285—302 |
| 2,438,312 | 3/1948 | Bunn et al. | 285—302 X |
| 2,520,501 | 8/1950 | Guiler et al. | 285—302 X |
| 3,306,636 | 2/1967 | Hereth | 285—302 X |

FOREIGN PATENTS 675,935  7/1952  Great Britain.

DAVE W. AROLA, Primary Examiner

U.S. Cl. X.R.

285—302, 424, 287